United States Patent [19]

Bürge et al.

[11] 4,454,311

[45] Jun. 12, 1984

[54] PHENOL MODIFIED SULFAMATE-MELAMINE-FORMALDEHYDE RESIN

[75] Inventors: Theodor Bürge, Geroldswil; Jürg Widmer, Zurich; Theodor Meyer, Regensdorf; Ulrich Sulser, Oberengstringen, all of Switzerland

[73] Assignee: Sika AG, vorm. Kaspar Winkler & Co., Zurich, Switzerland

[21] Appl. No.: 428,530

[22] Filed: Sep. 30, 1982

[30] Foreign Application Priority Data

Oct. 26, 1981 [CH] Switzerland ............... 6821/81

[51] Int. Cl.³ .................... C08G 12/32; C08G 8/10
[52] U.S. Cl. ........................ 528/245; 106/90; 544/200; 528/148; 528/156; 528/158; 528/254
[58] Field of Search ............... 528/158, 254, 262, 269, 528/245, 148, 156, 162; 106/90

[56] References Cited

U.S. PATENT DOCUMENTS

| 2,112,434 | 3/1938 | Bruson | 528/158 |
| 2,310,038 | 2/1943 | Rust | 528/262 |
| 2,389,416 | 11/1945 | D'Alelio | 528/262 |
| 2,512,720 | 6/1950 | Keim | 528/262 |
| 2,550,639 | 4/1951 | Dawson | 528/254 |

FOREIGN PATENT DOCUMENTS

| 2915018 | 8/1980 | Fed. Rep. of Germany | 528/262 |
| 395418 | 6/1974 | U.S.S.R. | 528/262 |

*Primary Examiner*—Theodore E. Pertilla
*Attorney, Agent, or Firm*—Abelman, Frayne, Rezac & Schwab

[57] ABSTRACT

The invention provides a polycondensation product of
(a) sulfamic acid ($H_2N-SO_3H$) and/or at least one N-substituted organic derivative of the sulfamic acid as such or in the form of their salts,
(b) formaldehyde and/or glyoxal
(c) melamine and/or at least one phenolic compound.

This polycondensation product may be used as at least one component in a material for construction.

6 Claims, 1 Drawing Figure

PHENOL MODIFIED SULFAMATE-MELAMINE-FORMALDEHYDE RESIN

BACKGROUND OF THE INVENTION

Field of the Invention

It is already known to add sodium salts of sulfonated melamine-formaldehyde resins to inorganic materials for construction, in order to improve their workability and their stability development.

For the practice the resins known up to now may not be prepared in the desired high concentration. Already at a solid content of more than 35% the resins show an unserviceable high viscosity, which still increases when the resins are stored. These resins are not suitable as salts of multivalent cations because they are insoluble. Due to the high dosage of these resin solutions from 1 to 5%, referred to the binding agent mixture, high portions of alkalis reach the material for construction. The negative influence of alkalis on the stability development, the shrinkage and especially the reactivity with certain silicatic additive materials are known. For this reason in West Germany the expert committee on "Betonzusatzmittel" ("concrete additive agents") determined the alkali content for additive agents in the case of danger of disadvantageous reactions in concrete to a maximum of 0.02% $Na_2O$, referred to the binding agent.

Known testing prescriptions are e.g. in the U.S.A. the ASTM standards C 295, C 227 and C 289.

SUMMARY OF THE INVENTION

Hence, it is a general object of this invention to provide highly concentrated, low viscose, the water content reducing, water soluble and storable additive materials, which may be used also in the alkali-free form.

The above object is realized by the inventive polycondensation product.

The invention will be better understood and objects other than the above one will become apparent when consideration is given to the following detailed description thereof.

DETAILED DESCRIPTION OF THE INVENTION

Figure 1:
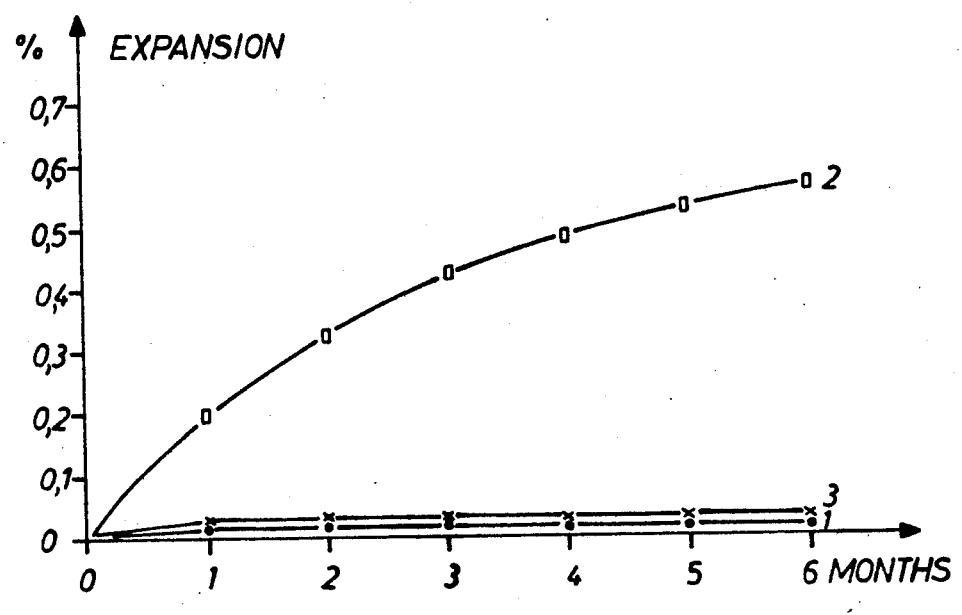
FIG. 1 compares the expansion values of a mortar without any additive material (curve 1), a mortar containing a commercially available sodium salt of a sulfonated melamine-formaldehyde resin (curve 2), and a mortar containing the calcium salt of Example 2 of the present invention (curve 3).

With the polycondensation products of this invention the workability and the physical and chemical properties of materials for construction may be improved.

According to this invention the polycondensation products may be used also as solutions of their salts of multivalent cations, e.g. the calcium salts, whereby all negative influences of the alkalis are eliminated. Therefore, the resins of this invention may be used without hesitation as additive materials for materials for construction together with alkali reactive additive materials.

The following examples shall illustrate the preparation and the effect of the polycondensation products of this invention.

A preferred embodiment of the invention is a polycondensation product resulting from 3 to 10 mols of formaldehyde, 3 to 6 mols sulfamic acid or one of its salts, 0.44 to 1 mol of a polyamino compound and 0 to 2 mols of a phenolic compound.

EXAMPLE 1

To 245 parts per weight of sulfamic acid in 250 parts per weight of water are added 100 parts per weight of calcium hydroxide. After the heating to a temperature of 60° C. there are successively added 190 parts per weight of 40% glyoxal and 100 parts per weight of 38% formalin, and the resulting solution is heated for one hour to a temperature of 75° C. By the addition of sulfamic acid to the solution there is then adjusted a pH value of 5.5, and the mixture is heated to a temperature of 80° C. for one hour. After cooling to a temperature of 20° C. calcium hydroxide is added in order to adjust a pH value of pH=8. There is obtained a clear, dark yellow solution having a solid content of 50% and a viscosity of 41 centipoise.

EXAMPLE 2

To 256 g (2.64 mol) sulfamic acid in 200 g water are added portion by portion 105 g calcium hydroxide. Then are added 112 g (0.88 mol) melamine and 435 g (5.4 mol) 37% formalin. Then the solution is heated to a temperature of 75° C. for 40 minutes, and then is adjusted a pH value of 5.8 by adding sulfamic acid. Then the mixture is heated to a temperature of 80° C. for one hour, and then is adjusted a pH value of 9 by adding calcium hydroxide.

There is obtained a clear, colorless solution having a solid content of 53% and a viscosity of 55 centipoise.

EXAMPLE 3

To 128 g (1.32 mol) sulfamic acid in 100 g water are added 112 g 50% sodium hydroxide, and then are added 56 g (0.44 mol) melamine and then 216 g (2.66 mol) 37% formalin. When a clear solution is formed, after ½ hour the mixture is heated to a temperature of 75° C., and then the solution is adjusted to a pH value of 5.8 by adding sulfamic acid, and then the mixture is heated to a temperature of 80° C. for one hour. After cooling to a temperature of 20° C. a pH value between 8 and 9 is adjusted by adding 50% sodium hydroxide.

The clear, colorless solution has a dry content of 50% and a viscosity of 60 centipoise.

EXAMPLE 4

To 256 g (2.64 mol) sulfamic acid and 138 g (1.0 mol) salicylic acid in 300 g water are added portion by portion 142 g calcium hydroxide. Then are added 112 g (0.44 mol) melamine and 590 g (7.4 mol) 37% formalin. When a clear solution is formed, the mixture is heated to a temperature of 80° C. for two hours. Then is adjusted a pH value of 5.5 by adding sulfamic acid, and then the solution is heated to a temperature of 85° C. for two hours. After cooling to a temperature of 20° C. a pH value of 9.0 is adjusted by the addition of calcium hydroxide. The clear, colorless solution has a solid content of 55% and a viscosity of 70 centipoise.

EXAMPLE 5

To 256 g (2.64 mol) sulfamic acid and 94.1 g (1.0 mol) phenol in 300 g water are added portion by portion 105 g calcium hydroxide. Then are added 112 g (0.88 mol) melamine and 671 g (8.4 mol) 37% formalin. The solution is heated to a temperature of 80° C. for three hours, then the mixture is adjusted to a pH=5.0 by adding sulfamic acid, and then the mixture is kept at a temperature of 85° C. for 3 hours. After cooling to a temperature of 20° C. a pH value of pH=9.0 is adjusted by adding calcium hydroxide.

The clear, brown solution has a solid content of 52% and a viscosity of 60 centipoise.

EXAMPLE 6

According to ANS/ASTM Standard C 227 there were prepared mortar prisms for the examination of the potential alkali aggregate reaction. In alteration to the above standard there were used prisms of the dimensions 4 cm×4 cm×16 cm and the mortar consisted of 1 part by weight of Portland cement and 3 parts by weight of sand having a grain size of 0–6 mm. The used additive material was an alkali reactive sand of northern Germany origin. The expansion measurements were carried out always at three mortar prisms.

There were compared the expansion values of a mortar without an additive material (curve 1, FIG. 1), of a mortar containing a commercially available sodium salt of a sulfonated melamine-formaldehyde resin (curve 2), and of a mortar containing the inventive calcium salt according to example 2 (curve 3).

According to ASTM Specification C 33 an expansion of more than 0.5% after 3 months or an expansion of more than 0.10% after 6 months, respectively, is an indication to an alkali silicate reaction which may lead to a destruction of the material for construction.

With the inventive calcium salt the danger limit was not reached, but with the sodium salt of a commercially available sulfonated melamine formaldehyde resin, the danger limit was passed over 5 times.

EXAMPLE 7

| Experiments with concrete (Examples 1 to 5) Concrete according to SIA standard 162, cement content 300 kg/m³, W/Z 0.450 Dosage of the inventive additive material 1% |||||| 
|---|---|---|---|---|---|
| Inventive additive material | Plasticity expansion cm | Crushing strength in N/mm² ||||
| | | 1 day | 3 days | 7 days | 28 days |
| without | 34 | 5.2 | 12.8 | 26.3 | 33.9 |
| according to Example 1 | 51 | 3.4 | 11.8 | 23.1 | 38.2 |
| acc. to Example 2 | 53 | 11.3 | 20.7 | 29.5 | 43.0 |
| acc. to Example 3 | 52 | 10.5 | 20.0 | 29.4 | 42.1 |
| acc. to Example 4 | 54 | 9.2 | 18.6 | 26.4 | 42.3 |
| acc. to Example 5 | 54 | 9.7 | 18.8 | 27.8 | 41.0 |

What is claimed is:
1. Polycondensation product of
   (a) sulfamic acid ($H_2N$—$SO_3N$ and/or at least one N-substituted organic derivative of the sulfamic acid as such or in the form of their salts,
   (b) formaldehyde, glyoxal or formaldehyde and glyoxal,
   (c) melamine, or melamine and at least one phenolic compound.
2. Polycondensation product according to claim 1, wherein the salts of the component (a) are the ammonium-, alkali metal- or alkaline earth metal-salts.
3. Polycondensation product according to claim 1 or 2 wherein it is the condensation product of 3 to 10 mols formaldehyde with 3 to 6 mols sulfamic acid or one of their salts thereof, 0.44 to 1 mol of melamine and 0 to 2 mols of a phenolic compound.
4. Polycondensation product according to claim 2 wherein the salts of the component (a) are calcium salts.
5. Polycondensation product according to claim 1, 2 or 4 wherein the phenolic compound used as component (c) is phenol.
6. Polycondensation product according to claim 1, 2 or 4 wherein the phenolic compound used as component (c) is salicylic acid.

* * * * *